(12) United States Patent
Kato et al.

(10) Patent No.: US 7,226,678 B2
(45) Date of Patent: Jun. 5, 2007

(54) FUEL CELL STACK

(75) Inventors: Hideo Kato, Utsunomiya (JP); Katsumi Hayashi, Utsunomiya (JP); Shigeru Inai, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/491,836

(22) PCT Filed: Oct. 3, 2002

(86) PCT No.: PCT/JP02/10321

§ 371 (c)(1),
(2), (4) Date: Oct. 6, 2004

(87) PCT Pub. No.: WO03/032423

PCT Pub. Date: Apr. 17, 2003

(65) Prior Publication Data

US 2005/0042492 A1 Feb. 24, 2005

(30) Foreign Application Priority Data

Oct. 3, 2001 (JP) .............................. 2001-307937

(51) Int. Cl.
*H01M 8/04* (2006.01)
*H01M 8/24* (2006.01)

(52) U.S. Cl. .......................................... 429/23; 429/22

(58) Field of Classification Search ...................... None
See application file for complete search history.

(56) References Cited

U.S. PATENT DOCUMENTS

| 4,555,452 | A | | 11/1985 | Kahara et al. |
| 5,023,150 | A | * | 6/1991 | Takabayashi ................. 429/22 |
| 6,724,194 | B1 | * | 4/2004 | Barton ........................ 324/432 |

FOREIGN PATENT DOCUMENTS

| JP | 60-189871 | | 9/1985 |
| JP | 63-181268 | | 7/1988 |
| JP | 64-71073 | | 3/1989 |
| JP | 9-199151 | | 7/1997 |
| JP | 09-199151 | * | 7/1997 |
| JP | 10-223248 | | 8/1998 |
| JP | 2000-223141 | | 8/2000 |
| JP | 2002-319424 | | 10/2002 |
| WO | WO-00/68700 | | 11/2000 |

* cited by examiner

*Primary Examiner*—John S. Maples
(74) *Attorney, Agent, or Firm*—Lahive & Cockfield, LLP; Anthony A. Laurentano, Esq.

(57) ABSTRACT

A fuel cell stack which comprises a plurality of unit fuel cells laminated via separators, and is connected to external resistors each allowing a feeble current to flow to each unit fuel cell, whereby such problems as an open-circuit voltage generation and corrosion that may be caused by fuel gas remaining after operation shutdown can be resolved. A switch is preferably attached in series with an external resistor.

4 Claims, 11 Drawing Sheets

Fig. 22 -- Prior Art --
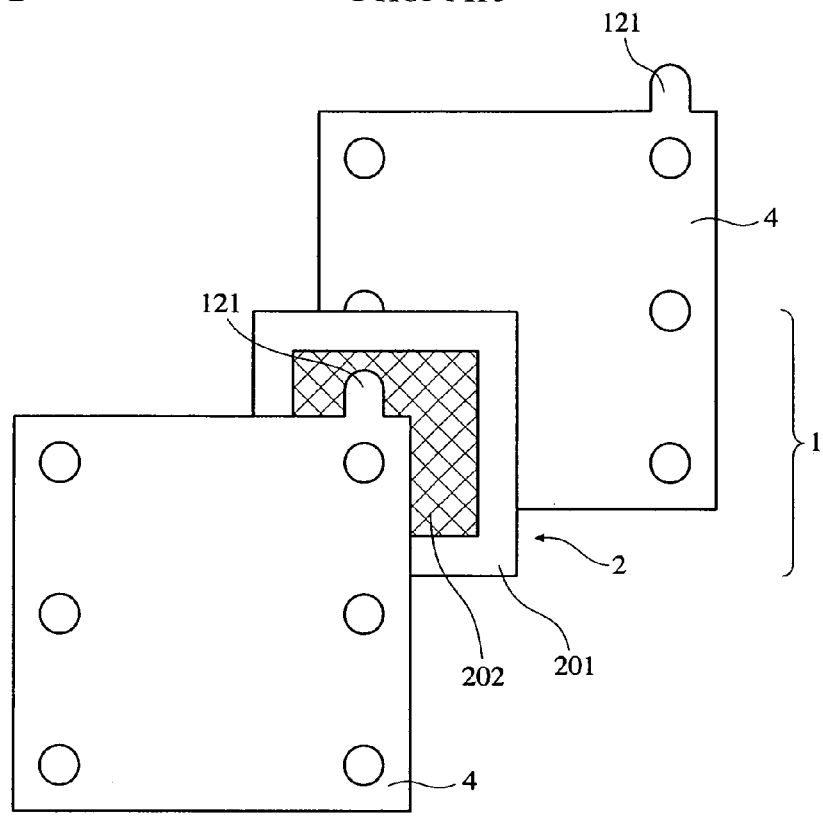
Fig. 23 -- Prior Art --
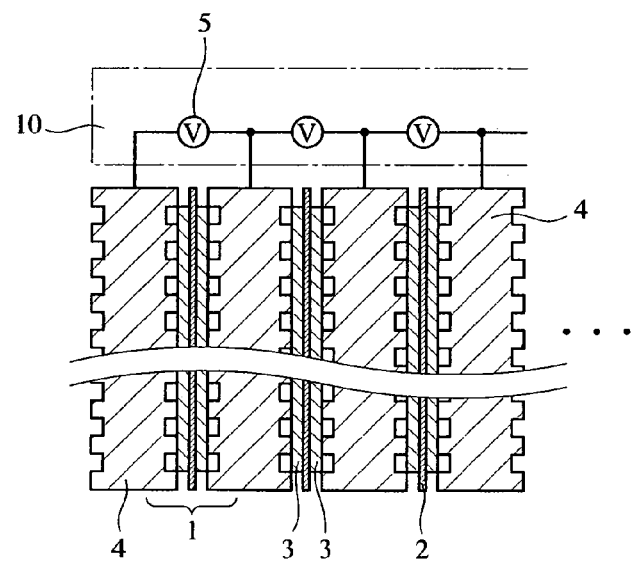

FUEL CELL STACK

RELATED APPLICATIONS

This application is a 35 U.S.C. 371 national stage filing of International Application No. PCT/JP02/10321, filed 3 Oct. 2002, which claims priority to Japanese Patent Application No. 2001-307937 filed on 3 Oct. 2001 in Japan. The contents of the aforementioned applications are hereby incorporated by reference.

FIELD OF THE INVENTION

The present invention relates to a fuel cell stack free from the generation of an excessive open circuit voltage at the time of low-temperature start, and the corrosion of constituent members due to an open circuit voltage caused by a gas remaining after operation stop.

BACKGROUND OF THE INVENTION

A fuel cell stack has a structure comprising pluralities of stacked fuel cell units (cells) 1, each of which comprises a membrane electrode assembly (electrode structure) 2 constituted by an electrolyte membrane 201 and catalytic electrodes 202 formed on both surfaces thereof, and a pair of separators 4, 4 disposed on both sides of the membrane electrode assembly 2 via a gas diffusion layer (not shown) such as a carbon paper, etc. as shown in FIG. 22. One separator 4 is provided with fuel (hydrogen) gas-flowing grooves on a surface opposing the electrode structure 2, and the other separator 4 is provided with air-flowing grooves on a surface opposing the electrode structure 2. Each separator 4 is also provided on a periphery thereof with a projection terminal 121 serving as a terminal for outputting cell voltage, which is connected to a voltage-measuring apparatus attached to the fuel cell stack. To determine whether or not each fuel cell unit 1 constituting the fuel cell stack is under a normal operation, the voltage of each fuel cell unit 1 is measured by a voltmeter 5 disposed on a lead wire connected to a pair of separators 4, 4 arranged on both sides of each electrode structure 2 (see FIG. 23).

In a fuel cell stack of such a structure, a hydrogen gas and an oxygen gas in the air are reacted to generate electric power. Because the fuel gas remains in the fuel cell stack at the time of operation stop, power generation does not immediately stop but continues in each fuel cell unit while the remaining fuel gas and the air exist, resulting in the generation of an open circuit voltage between a pair of separators 4, 4 disposed on both sides of each electrode structure 2. Thus, working around the fuel cell stack immediately after operation stop might result in short-circuiting or electric shock.

Also, if the fuel cell stack is left to stand in a state in which about 1 V of an open circuit voltage exists per a unit cell, the particle size of a catalyst on a surface of the electrolyte membrane 201 would increase, and members constituting the fuel cell stack, for instance, metal or carbon separators would be corroded. For instance, in the case of a separator made of a metal such as stainless steel, etc., each separator may be formed by as thin a pressed plate as about 0.1 mm to decrease the laminate thickness of the overall fuel cell stack. In such a case, corrosion due to the above open circuit voltage may form penetrating pores in the separator.

On the other hand, in the case of start at such low temperatures as a freezing point or lower, the open circuit voltage becomes extremely high when a gas is introduced. In the case of start at −30° C., for instance, 1.35 V of an open circuit voltage may be generated, because the electrolyte membrane 201 is dry. Once current flows in that state, the electrolyte membrane 201 becomes a water-containing state, resulting in decrease in the open circuit voltage to nearly 1 V.

As described above, because the generation of an extremely high open circuit voltage is inevitable, it is necessary for an electric circuit to have high breakdown voltage to resist such open circuit voltage, resulting in increase in the cost of a fuel cell system accordingly.

To solve the above problem, there is a method of purging a fuel gas remaining in the fuel cell stack after the operation stop by an inert gas. Because a nitrogen gas is usually used as an inert gas, a tank for an inert gas is necessary to carry out this method. In automobiles, etc., however, not only a space for a tank for an inert gas is needed, but also there are problems of controlling the amount of the inert gas stored in the tank and its supply, making the overall fuel cell system complicated. Accordingly, purge with an inert gas is available only in an experiment fuel cell stack, and its practical use is difficult.

There is also a method of connecting resistors to terminals on both sides of the fuel cell stack and causing current to flow therethrough so that a gas remaining in the fuel cell stack is consumed to lower the open circuit voltage. In this case, the resistors are series-connected to pluralities of fuel cell units. However, the amount of the remaining fuel gas is not necessarily the same from one fuel cell unit to another, but often different. Accordingly, when current is caused to flow via the resistors connected to the fuel cell units, a reverse voltage is applied to fuel cell units, in which a fuel gas remains in small amounts and thus is consumed at higher speeds, resulting in the likelihood of damage to the fuel cell units.

OBJECT OF THE INVENTION

Accordingly, an object of the present invention is to provide a fuel cell stack having a structure of effectively lowering an open circuit voltage without damaging each fuel cell unit, thereby solving the problems of the open circuit voltage and corrosion generated by a fuel gas remaining after the operation stop.

DISCLOSURE OF THE INVENTION

As a result of intense research in view of the above object, the inventors have found that when a fuel gas remains in a fuel cell stack after operation stop, decreasing an open circuit voltage generated by the remaining fuel gas by an external resistor connected to each fuel cell unit can solve the problems of damage and corrosion of the fuel cell unit. The present invention has been completed based on this finding.

Thus, the fuel cell stack of the present invention comprises pluralities of fuel cell units and separators laminated alternately, an external resistor being connected to each fuel cell unit so that small current flows therethrough. With this structure, an open circuit voltage generated in each fuel cell unit can be decreased by each external resistor, to prevent the damage and corrosion of the fuel cell unit.

A switch is preferably series-connected to the external resistor. With this structure, electric power loss by the external resistors can be prevented during the operation of the fuel cell stack.

In a preferred embodiment of the present invention, a voltage-measuring apparatus is mounted to the fuel cell stack to check whether or not each fuel cell unit is normally operated; a terminal projecting from a periphery of each separator is connected to each voltage-inputting terminal of the voltage-measuring apparatus; and each external resistor disposed in the voltage-measuring apparatus is connected to each voltage-inputting terminal in parallel to each voltmeter. The external resistors are preferably series-connected to each other.

According to a preferred embodiment of the present invention, the terminal projecting from each separator is connected to each voltage-inputting terminal of the voltage-measuring apparatus via each terminal member; and each terminal member is supported by each partition of an insulating casing having pluralities of partitions in an insulating state. With each terminal member inserted into each slit of the insulating casing having pluralities of partitions, the positioning of pluralities of terminal members can be secured easily, thereby surely preventing them from being in contact with each other.

BRIEF DESCRIPTION OF THE DRAWINGS

FIG. 22 is an exploded front view showing the structure of a cell constituting the fuel cell stack; and FIG. 23 is a partial cross-sectional view showing a fuel cell stack, to which the present invention is applicable.

BEST MODE FOR CARRYING OUT THE INVENTION

Figure 1:
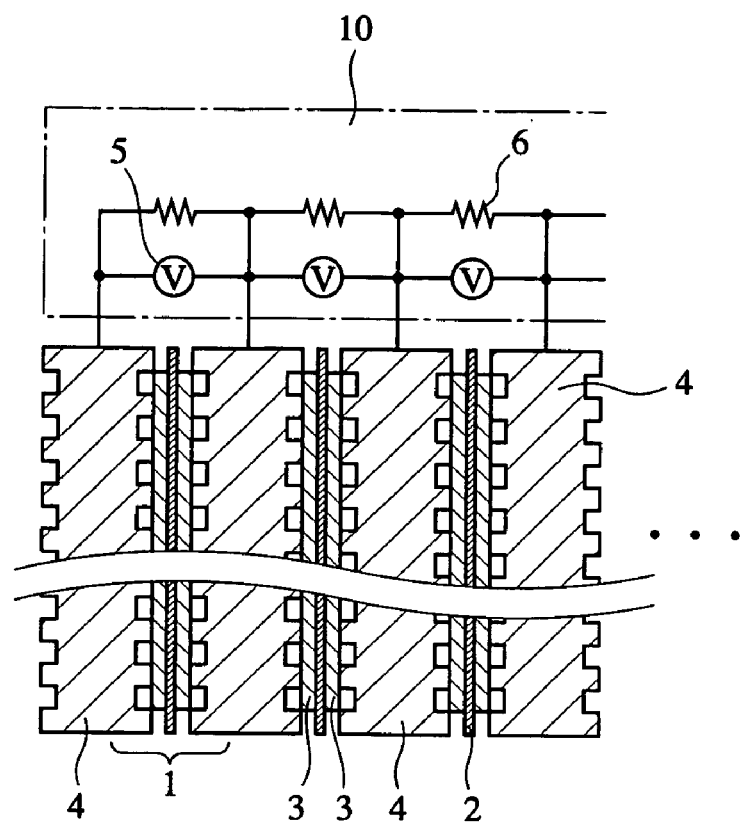
FIG. 1 is a partial cross-sectional view showing a fuel cell stack according to one embodiment of the present invention.

FIG. 1 is a partial cross-sectional view showing a fuel cell stack according to one embodiment of the present invention. Each fuel cell unit 1 comprises an electrode structure 2, gas diffusion layers 3, 3 constituted by a carbon paper and disposed on both sides of the electrode structure 2, and a pair of separators 4, 4 disposed on both sides of the gas diffusion layers 3, 3. The electrode structure 2 is composed of a polyelectrolyte membrane and electrode layers formed on both surfaces thereof, each electrode layer containing a precious metal such as platinum, etc. The fuel cell stack is obtained by stacking a combination of the electrode structure 2 and a pair of gas diffusion layers 3, 3, and the separator 4 alternately. Both surfaces of each separator 4 are provided with gas-flowing grooves. However, when the separator is provided with grooves for flowing a cooling medium, a pair of separators each provided with gas-flowing grooves on one surface and cooling-medium-flowing grooves on the other surface are preferably combined with the cooling-medium-flowing grooves inside.

Among a pair of separators 4, 4 sandwiching the electrode structure 2, the separator 4 on the side of a fuel gas (hydrogen gas) constitutes a negative electrode, and the separator 4 on the side of air constitutes a positive electrode. Thus, each fuel cell unit generates an electromotive force between adjacent pairs of separators 4, 4. The electromotive force of the entire fuel cell stack can be obtained by connecting pairs of separators 4, 4 in series. To check whether or not each fuel cell unit operates normally, a voltmeter 5 is disposed between a pair of separators 4, 4 sandwiching the electrode structure 2.

The fuel cell stack of the present invention comprises an external resistor 6 connected between each pair of separators 4, 4 to flow small current therethrough. The external resistor 6 is connected to the voltmeter 5 in parallel, and both are housed in a voltage-measuring apparatus 10 mounted to the fuel cell stack. Plural external resistors 6 are series-connected to each other.

In the embodiment shown in FIG. 1, the external resistors 6 always connected to the separators 4 should have sufficiently large resistance so that they do not affect the output of the fuel cell stack. Specifically, the resistance of the external resistors 6 is preferably set such that power consumption by the external resistors 6 is 1.5% or less, more preferably 0.5% or less of the output of the fuel cell stack.

Figure 2:
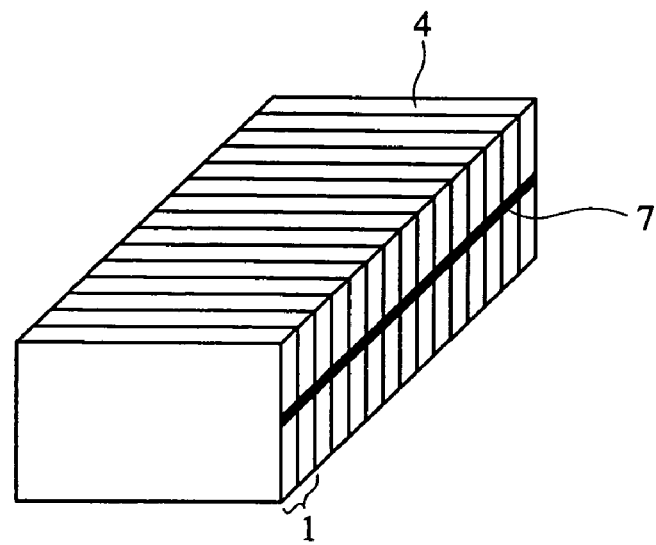
FIG. 2 is a perspective view showing a fuel cell stack according to another embodiment of the present invention.
Figure 3:
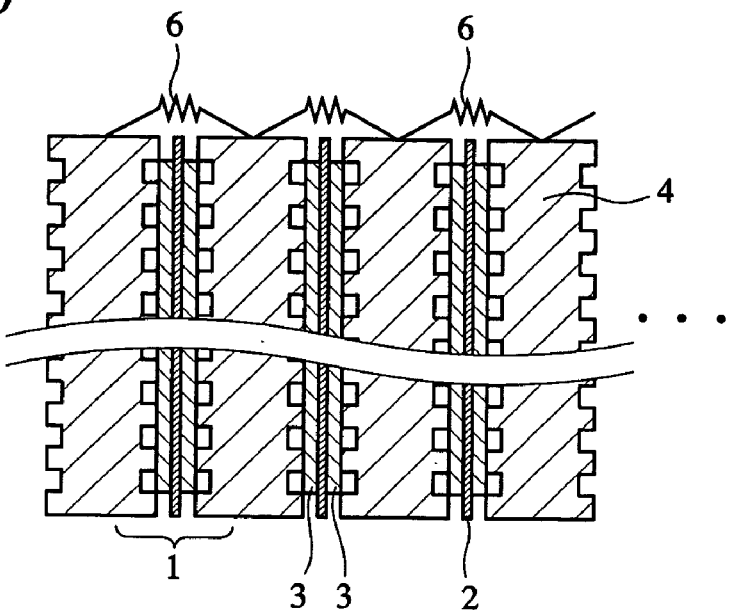
FIG. 3 is a cross-sectional view showing an equivalent circuit of the fuel cell stack in FIG. 2.

FIG. 2 is a perspective view showing a fuel cell stack according to another embodiment of the present invention. In this embodiment, one external resistor 7 is attached to pluralities of separators 4 on one side, such that the external resistor 7 extends along all the fuel cell units 1. FIG. 3 shows an equivalent circuit of the external resistors 6 in the fuel cell stack of FIG. 2. Each external resistor 6 with sufficiently large resistance not only prevents adjacent separators 4, 4 from short-circuiting, but also consumes the remaining fuel gas to reduce an open circuit voltage when the open circuit voltage exists because of the remaining fuel gas. Specifically, the resistance of the external resistors 6 is set such that the power consumption of the external resistors 6 is 1.5% or less, preferably 0.5% or less, of the output of the fuel cell stack.

Figure 4:
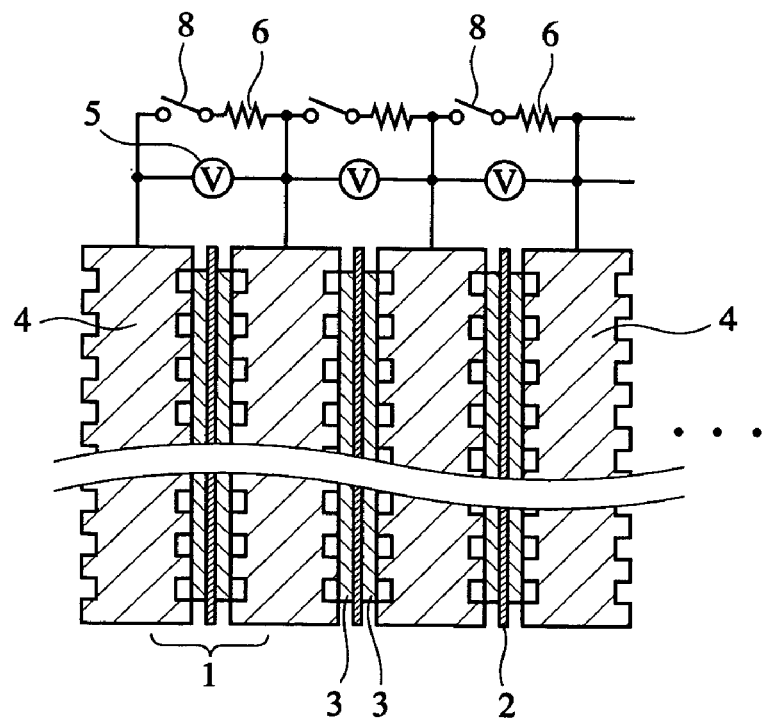
FIG. 4 is a partial cross-sectional view showing a fuel cell stack according to a further embodiment of the present invention.

FIG. 4 is a partial cross-sectional view showing a fuel cell stack according to a further embodiment of the present invention. The fuel cell stack in this embodiment is the same as shown in FIG. 1, except that a switch 8 is connected to each external resistor 6. Accordingly, only the function of the switch 8 will be explained here.

In order that the generation of an extremely high open circuit voltage is avoided in the case of low-temperature start, for instance, start from such a low temperature as a freezing point or lower, the switch 8 is closed before introducing a fuel gas into the fuel cell stack, to connect the external resistor 6 to each fuel cell unit 1, and the switch 8 is quickly opened after the fuel gas is introduced. With the external resistor 6 connected to each fuel cell unit 1, it is possible to avoid the open circuit voltage from becoming excessively high at the time of low-temperature start.

With the switches 8 kept open during the operation of the fuel cell stack, the output of the fuel cell stack is prevented from decreasing by the external resistors 6. Though a fuel gas remains after the operation stop of the fuel cell stack, the switches 8 are closed at the same time as stopping a load so that the external resistors 8 are connected to the separators 4, thereby quickly lowering the voltage of the fuel cell stack. This causes current to flow to consume the remaining fuel gas, thereby quickly reducing the open circuit voltage to zero. The switches 8 are kept closed until the next start, so that the external resistors 6 are kept in a contact state.

Figure 5:
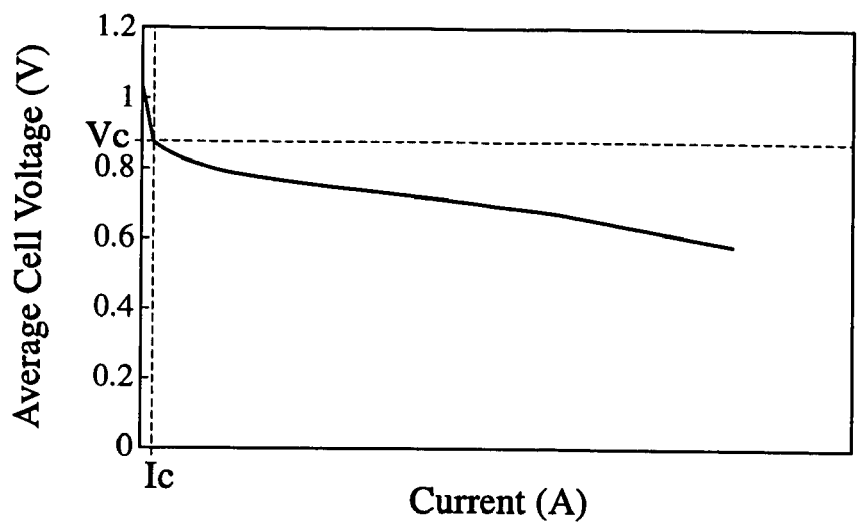
FIG. 5 is a graph showing the relation between current and average cell voltage in the fuel cell stack.

The operation of the switches 8 can be automatically controlled by the level of current flowing from the fuel cell units to an external circuit. For instance, as shown in FIG. 5, the average cell voltage of the fuel cell unit tends to increase as the current density decreases, but the corrosion of separators, etc. occurs when the average cell voltage exceeds a predetermined level Vc. Accordingly, the switches 8 are closed when the open circuit voltage becomes Vc or more, and opened when the open circuit voltage becomes less than Vc. The resistance of the external resistor 6 can be determined from current Ic at voltage Vc as Vc/Ic ($\Omega$).

Figure 6:
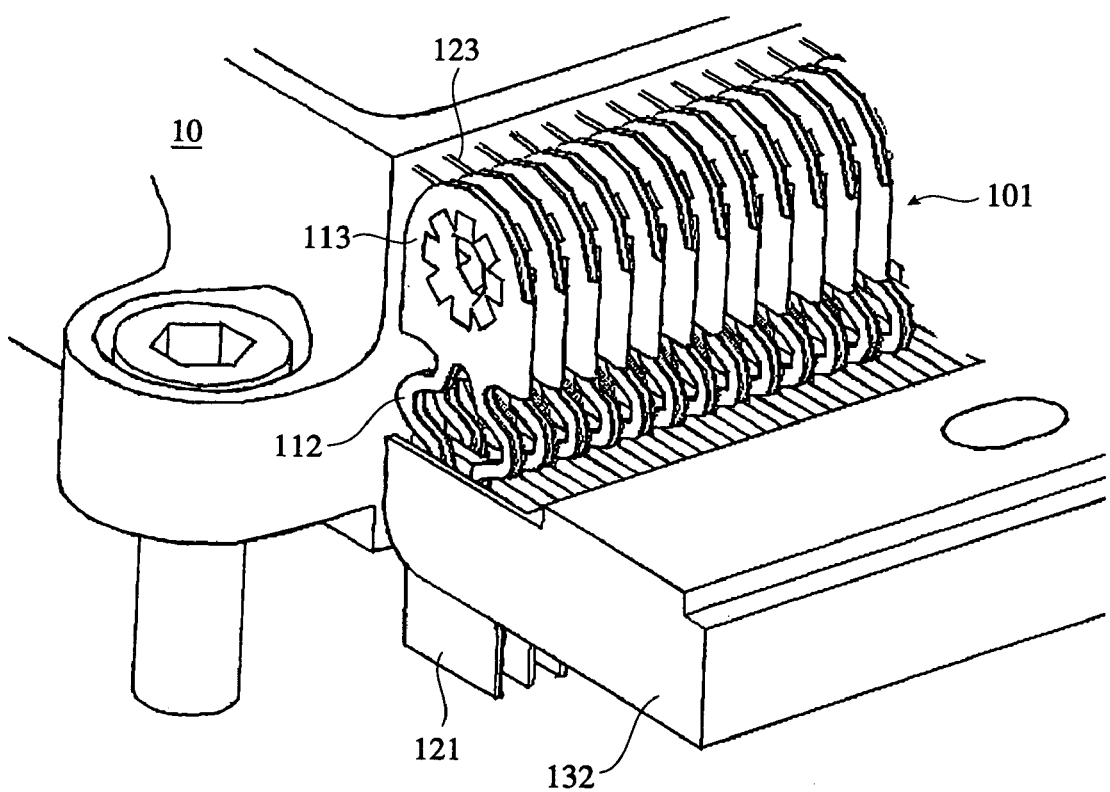
FIG. 6 a partial perspective view showing an insulating casing for connecting terminal members to voltage-measuring terminals of separators and voltage-inputting terminals of a voltage-measuring apparatus.

FIG. 6 shows the overall structure of one preferred example of the fuel cell stack of the present invention comprising the external resistors. This fuel cell stack comprises voltage-measuring terminals (projection terminals) 121 of separators (not shown) connected to voltage-inputting terminals 123 of a voltage-measuring apparatus 10 via terminal members 101 supported by a casing (only a lower casing 132 is shown). A large number of separators have voltage-measuring projection terminals 121 at upper ends of the fuel cell stack on both lateral sides. A large number of projection terminals 121 on each side are divided to pluralities of groups, and the terminal members 101 connected to the projection terminals 121 in each group are received in one insulating casing 130.

Figure 7:
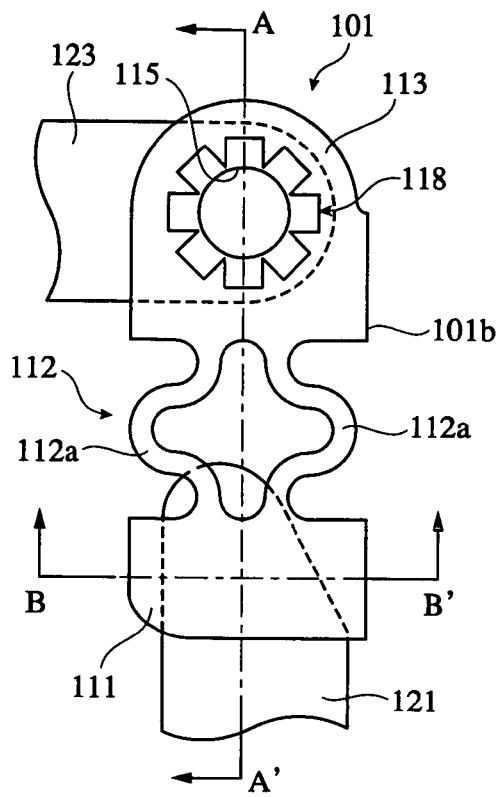
FIG. 7 is a front view showing one example of a terminal member suitably used in the fuel cell stack of the present invention.
Figure 8:
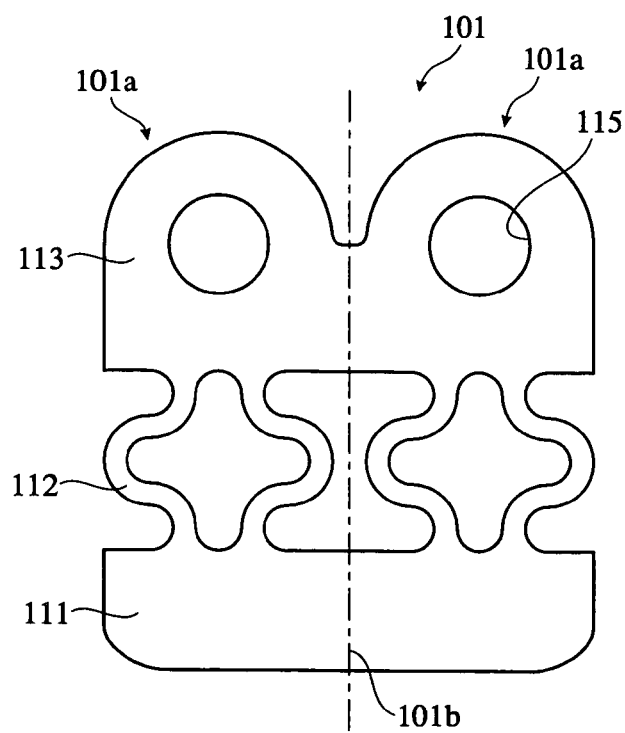
FIG. 8 is a development view showing the terminal member of FIG. 7, which is developed along a folding line.
Figure 9A:
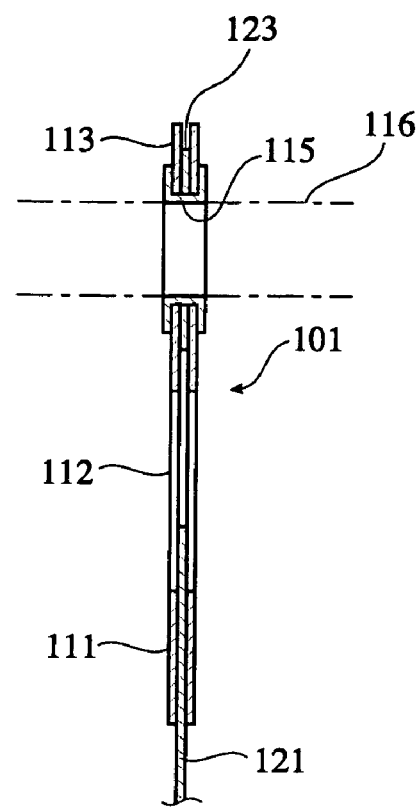
FIG. 9(a) is a cross-sectional view taken along the line A–A' in FIG. 7.

FIGS. 7 to 9 show one example of the terminal member 101 used in the fuel cell stack of the present invention. As shown in FIG. 8, the terminal member 101 is formed by a pair of thin metal plate pieces 101a, 101a of the same shape connected at one end, which is folded along a center 101b. Each thin metal plate piece 101a, 101a has a shape having portions corresponding to a tip end portion 111, an elastic support portion 112 and a fulcrum portion 113. When the thin metal plate pieces 101a, 101a are folded, the terminal member 101 has a substantially U-shaped cross section as shown in FIG. 10. The voltage-measuring terminal 121 is inserted into a gap in the tip end portion 111, and the voltage-inputting terminal 123 is inserted into a gap in the fulcrum portion 113.

In this embodiment, the elastic support portion 112 is constituted by a pair of outward curved narrow-width strip portions 112a, 112a. Because each strip portion 112a, 112a is narrow in width and curved, the terminal member 1 is easily deformed, so that the terminal members 1 can follow the displacement of the separators not only in a stack direction but also in two directions in perpendicular to the stack direction, when connected to a large number of the stacked separators.

Figure 9B:
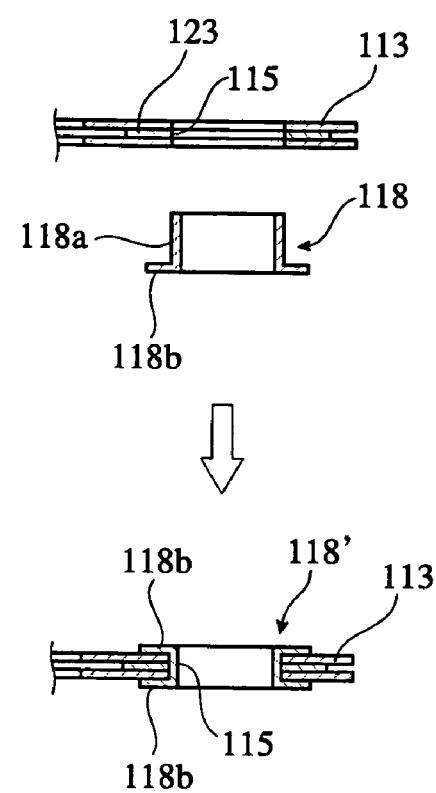
FIG. 9(b) is a schematic cross-sectional view showing the terminal member of FIG. 7 and an eyelet mounted thereto.
Figure 10:
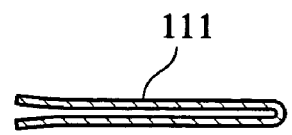
FIG. 10 is a cross-sectional view taken along the line B–B' in FIG. 7.

As shown in FIGS. 8 and 9, the fulcrum portion 113 has an opening 115 at a fulcrum position. This opening 115 is aligned with the opening of the voltage-inputting terminal 123, and rotatably and firmly connected thereto via an eyelet 118. As shown in FIG. 9(b), the eyelet 118 comprises a tube portion 118a, which is inserted into the opening 115 of the fulcrum portion 13, and a flange portion 118b for fixing the tube portion 118a. After inserting the tube portion 118a of the eyelet 118 into the opening 115, the tip end portion of the tube portion 118a is expanded by pressure by a tool, whereby the eyelet 118 is rotatably and firmly fixed to the opening 115. Because the opening of the eyelet 118 functions as a fulcrum when rotated, the terminal member 101 can be precisely positioned relative to the voltage-measuring terminals 121 and the voltage-inputting terminals 123.

Figure 11A:
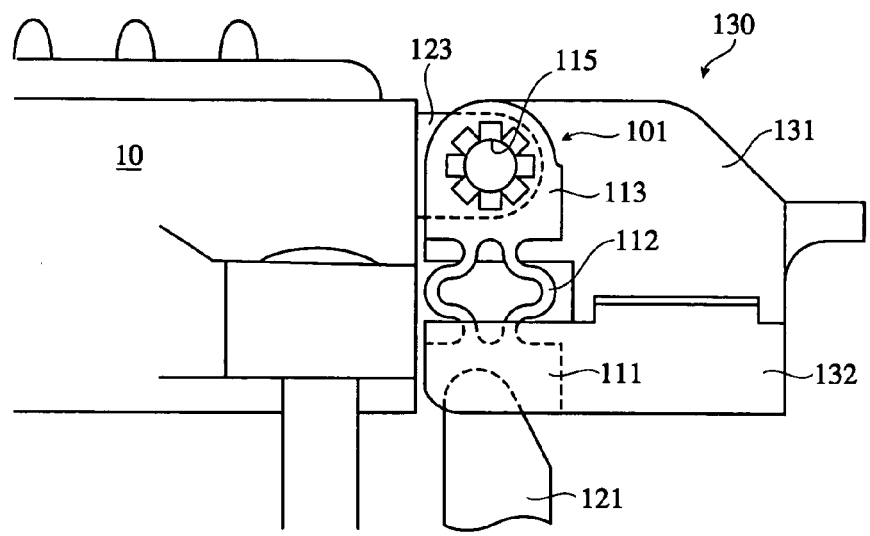
FIG. 11(a) is a partial enlarged view showing the details of a fuel cell stack comprising an insulating casing for connecting terminal members to voltage-measuring terminals of separators and voltage-inputting terminals of a voltage-measuring apparatus.
Figure 11B:
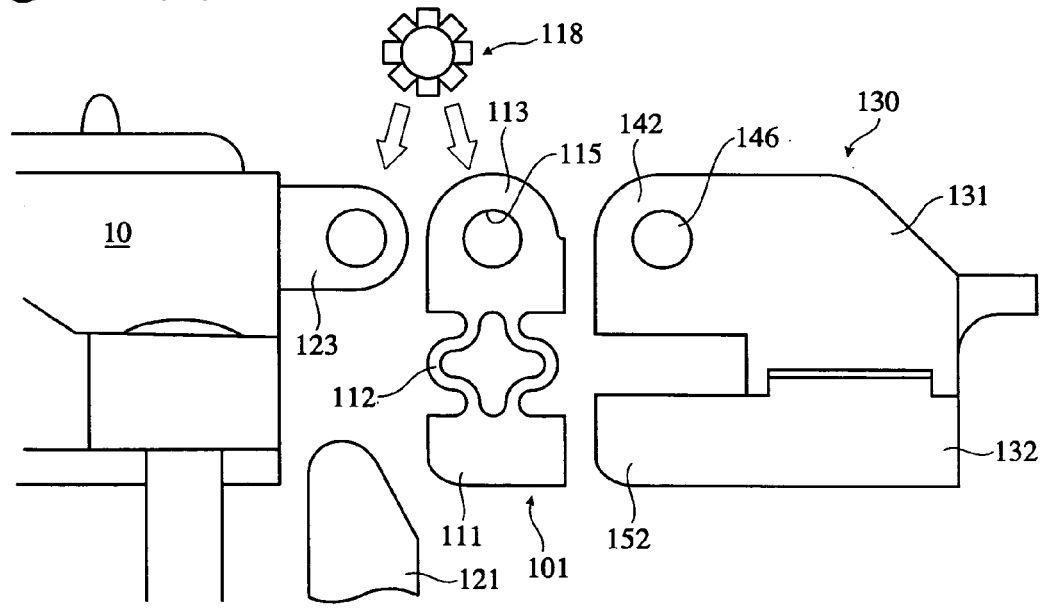
FIG. 11(b) is a partial enlarged, exploded view showing the details of a fuel cell stack comprising an insulating casing for connecting terminal members to voltage-measuring terminals of separators and voltage-inputting terminals of a voltage-measuring apparatus.

FIG. 11 shows in detail the relation between the terminal member 101 connected to the voltage-measuring terminal 121 and the voltage-inputting terminal 123, and the insulating casing 130. The insulating casing 130 is constituted by an upper casing 131 and a lower casing 132 both made of plastics, the upper casing 131 supporting the fulcrum portion 113 of the terminal member 101 connected to the voltage-inputting terminal 123, and the lower casing 132 supporting the tip end portion 111 of the terminal member 101 connected to the voltage-measuring terminal 121.

Figure 12:
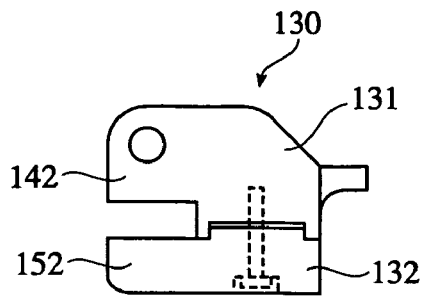
FIG. 12 is a side view showing an insulating casing, to which terminal members are mounted.
Figure 13:
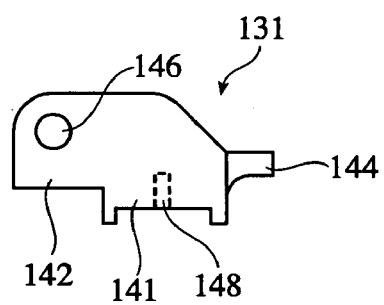
FIG. 13 is a side view showing an upper casing.
Figure 14:
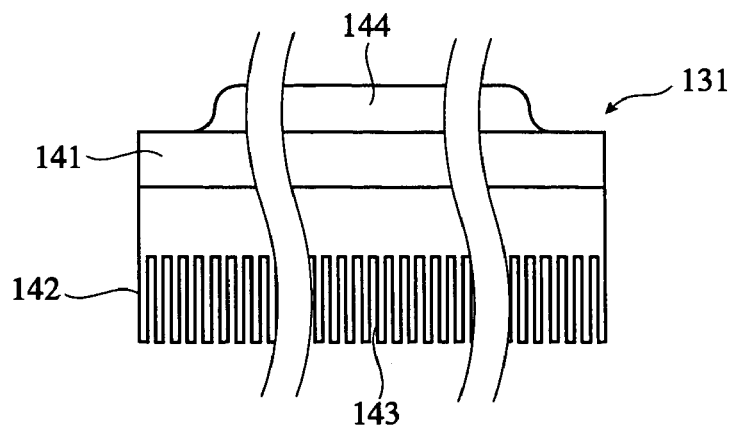
FIG. 14 is a plan view showing an upper casing.
Figure 15:
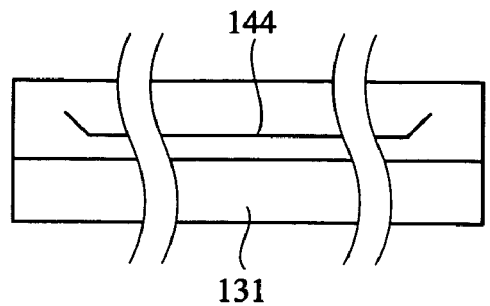
FIG. 15 is a rear view showing an upper casing.

FIG. 12 is a side view of the insulating casing 130, and FIG. 13 is a side view of an upper casing 131. FIG. 14 is a plan view of the upper casing 131, and FIG. 15 is a rear view of the upper casing 131. As is clear from FIGS. 13 to 15, the upper casing 131 comprises an integral body portion 141, comb teeth 142 having pluralities of narrow-width slits 143 integrally formed in a forward portion of the body portion 141 for preventing the adjacent terminal members 101 from being in contact with each other, and a ridge portion 144 integrally formed on a rear surface of the body portion 141. The pitch of the slits 143 is the same as the pitch of the terminals 121, 123 to be connected in a stack direction. The ridge portion 144 functions as a handle for rotating the casing 130. The comb teeth 142 are provided with through-holes 146 in a longitudinal direction. The body portion 141 is provided with a threaded hole 148 opening on a bottom surface.

Figure 16:
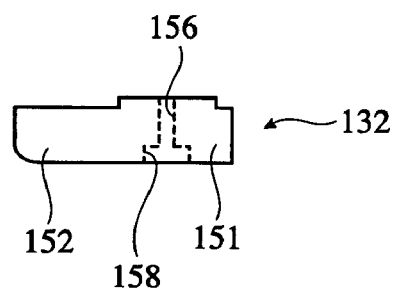
FIG. 16 is a side view showing a lower casing.
Figure 17:
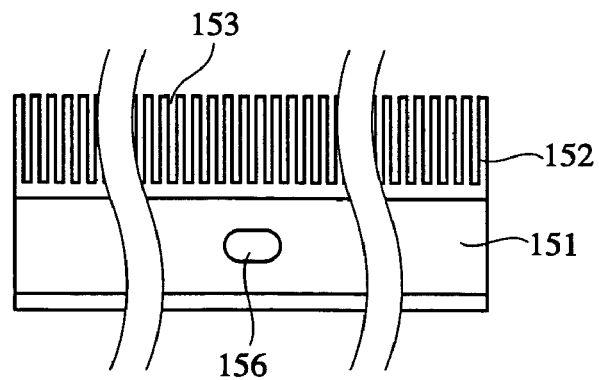
FIG. 17 is a plan view showing a lower casing.
Figure 18:
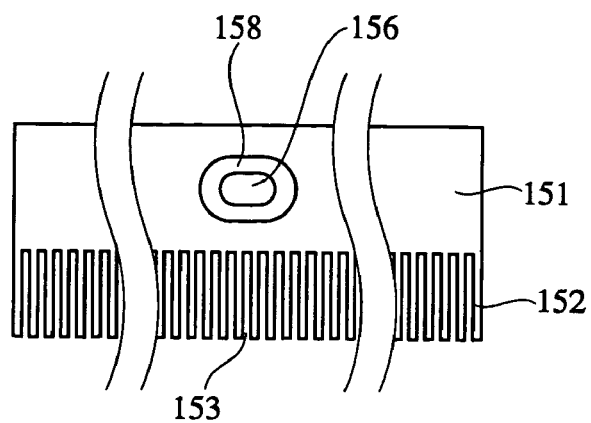
FIG. 18 is a bottom view showing a lower casing.
Figure 19:
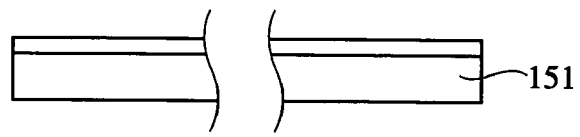
FIG. 19 is a rear view showing a lower casing.

FIG. 16 is a side view of the lower casing 132, FIG. 17 is its plan view, FIG. 18 is its bottom view, and FIG. 19 is its rear view. The lower casing 132 comprises an integral body portion 151, comb teeth 152 having pluralities of narrow-width slits 153 integrally formed in a front portion of the body portion 151 for preventing the adjacent terminal members 1 from being in contact with each other. The pitch of the slits 153 is the same as the pitch of the slit 143. The body portion 151 is provided with a hole 156 having a unidirectionally extended circular cross section at a position corresponding to the threaded hole 148 of the upper casing 131, and the opening of the unidirectionally extended circular hole 156 on a bottom surface is provided with a recess 158 for receiving a screw head. To align each slit 143, 153 of the comb teeth 142, 152 precisely, a hole 156 having a unidirectionally extended circular cross section makes the position of the lower casing 132 relative to the upper casing 131 in a stack direction of the fuel cell stack adjustable.

Figure 20:
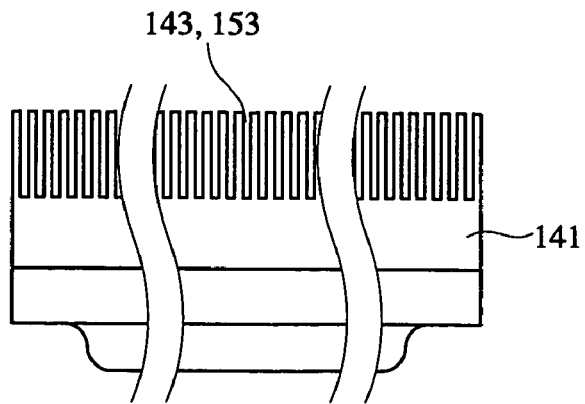
FIG. 20 is a plan view showing a casing assembled by screwing an upper casing to a lower casing.

As shown in FIG. 12, when the upper casing 131 is fixed to the lower casing 132 by a screw 159, both comb teeth 142, 152 are positioned on the same side, with the slits 143, 153 aligned. What is viewed from above is as shown in the plan view of FIG. 20.

Figure 21A:
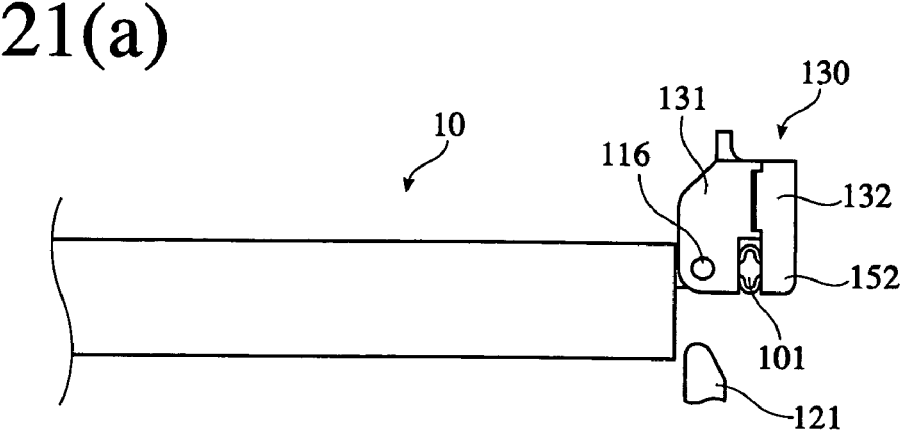
FIG. 21(a) is a schematic view showing a state where each terminal member and upper comb teeth of the insulating casing are connected to a voltage-inputting terminal, in the connection method of the terminal member mounted to the casing to the voltage-inputting terminal and the voltage-measuring terminal.

FIG. 21 shows a method for connecting a large number of terminal members 101 to voltage-measuring terminals 121 and voltage-inputting terminals 123 at a time using an insulating casing 130. First, as shown in FIG. 21(a), the comb teeth 143 of the upper casing 131 engage a row of voltage-inputting terminals 123 in a state where each terminal member 101 is inserted into a slit of the insulating casing 130, and each voltage-inputting terminal 123 is inserted into a slit having a U-shaped cross section of the fulcrum portion 113 of each terminal member 1. With the opening 115 of the fulcrum portion 113, the opening 125 of the voltage-inputting terminal 123, and the opening 146 of the upper casing 131 precisely aligned, the casing 130 supporting the terminal member 101 is rotatable around the openings 115, 146 as a fulcrum.

Figure 21B:
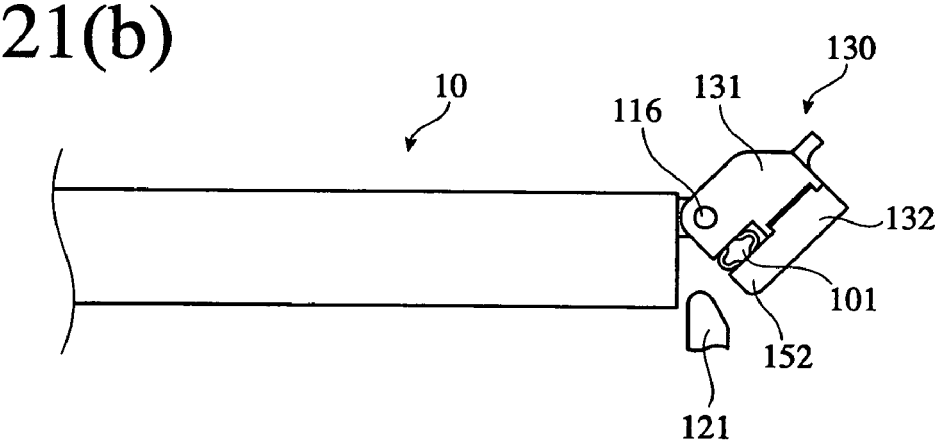
FIG. 21(b) is a schematic view showing a state where each terminal member mounted to the insulating casing is rotated around a fulcrum of a shaft engaging the voltage-inputting terminal, in the connection method of the terminal member mounted to the casing to the voltage-inputting terminal and the voltage-measuring terminal.
Figure 21C:
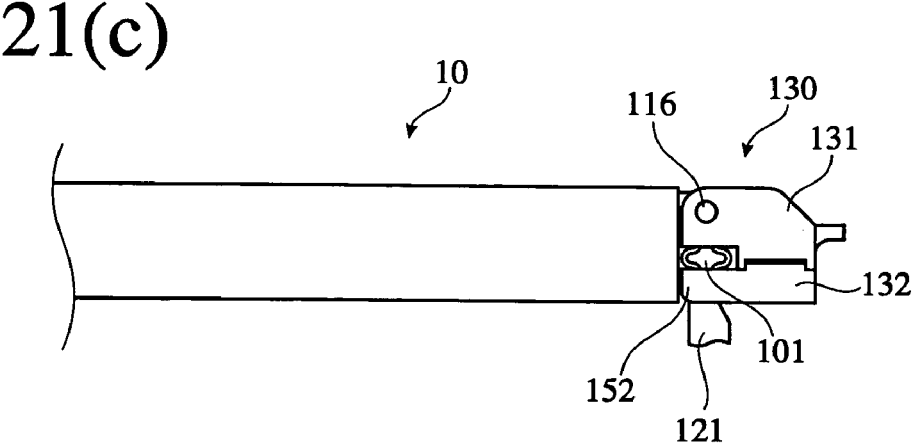
FIG. 21(c) is a schematic view showing a state where the rotation of each terminal member mounted to the insulating casing is completed, so that the terminal member is connected to the voltage-measuring terminal and lower comb teeth of a separator, in the connection method of the terminal member mounted to the casing to the voltage-inputting terminal and the voltage-measuring terminal.

Next, as shown in FIG. 21(b), the casing 130 holding the terminal members 101 is rotated to engage the comb teeth 152 of the lower casing 132 to the voltage-measuring terminals 121 of the separators, thereby inserting each voltage-measuring terminal 121 into a slit with a U-shaped cross section of the tip end portion 111 of each terminal member 101. FIG. 21(c) shows a state where each voltage-measuring terminal 121 of each separator is completely inserted into a slit with a U-shaped cross section of the tip end portion 111 of each terminal member 101.

As is clear from FIG. 11, the tip end portion 111 of each terminal member 101 sandwiches the voltage-measuring terminal 121 of the separator, and the fulcrum portion 113 sandwiches the voltage-inputting terminal 123 of the voltage-measuring apparatus 10, whereby each voltage-measuring terminal 121 is connected to each voltage-inputting terminal 123. In a state where the voltage-measuring terminals 121 is connected to the voltage-inputting terminals 123 via the terminal member 101, each comb piece of both comb teeth 142, 152 of the casing 130 serves as a separator for insulating the adjacent terminal members 101.

APPLICABILITY IN INDUSTRY

In the fuel cell stack of the present invention, because a high-resistance external resistor is connected to each fuel cell unit, reverse voltage due to the variation of the amount of a gas remaining in each fuel cell unit can be prevented. Particularly in the case of low-temperature start, the open circuit voltage, which would reach 1.35 V per a fuel cell unit, can be decreased to about 1 V, thereby making it possible to provide an electric circuit with low breakdown voltage. Also, because the open circuit voltage can be further decreased by always connecting the external resistors, the electric circuit may have a further lowered breakdown voltage. In addition, it is possible to prevent the parts constituting the fuel cell unit from being exposed to high voltage and deteriorated.

A switch connected to each external resistor, which can be opened and closed at the time of start and stop of operation, makes it possible to suppress the excess consumption a fuel gas during the operation (application of load), thereby improving fuel efficiency.

What is claimed is:

1. A fuel cell stack comprising:
   a plurality of fuel cell units and a plurality of separators alternately coupled together,
   an external resistor connected to each fuel cell unit so that current flows therethrough, wherein an open circuit voltage generated in each fuel cell unit is decreased by each external resistor connected to each of said plurality of fuel cell units, and
   a projection terminal protecting from each separator, wherein said projection terminal of each separator is connected to each voltage-inputting terminal of a voltage-measuring apparatus via each of a plurality of terminal members mounted to an insulating casing having a plurality of partitions, and wherein each terminal member is supported in an insulating state by each of said plurality of partitions of said insulating casing.

2. The fuel cell stack according to claim 1, further comprising a switch series-connected to said each external resistor.

3. The fuel cell stack according to claim 1, further comprising a projection terminal projecting from a periphery of each separator, wherein each said projection terminal is connected to each voltage-inputting terminal of a voltage-measuring apparatus mounted to said fuel cell stack, and wherein each external resistor disposed in said voltage-measuring apparatus is connected to each voltage-inputting terminal in parallel to each voltage-measuring apparatus.

4. The fuel cell stack according to claim 3, wherein said external resistors are series-connected to each other.

* * * * *